(12) United States Patent
Chung et al.

(10) Patent No.: US 6,301,303 B1
(45) Date of Patent: Oct. 9, 2001

(54) METHOD AND APPARATUS FOR PREDICTIVELY CODING SHAPE INFORMATION OF VIDEO SIGNAL

(75) Inventors: Jae Won Chung, Seoul; Jae Kyoon Kim, Taejon; Joo Hee Moon; Ji Heon Kweon, both of Seoul, all of (KR)

(73) Assignee: Hyundai Electronics Industries Co. Ltd., Seoul (KR)

( * ) Notice: Subject to any disclaimer, the term of this patent is extended or adjusted under 35 U.S.C. 154(b) by 0 days.

(21) Appl. No.: 08/858,551

(22) Filed: May 19, 1997

(30) Foreign Application Priority Data

Mar. 20, 1997 (KR) .................................................... 97-9532

(51) Int. Cl.⁷ ...................................................... H04N 7/28
(52) U.S. Cl. .................... 375/240.22; 382/203; 382/243; 375/240.12; 375/240.08; 375/240.1
(58) Field of Search .................................... 348/409, 414, 348/416, 417, 418, 422, 415; 382/190, 203, 243; H04N 1/133, 1/137, 7/28, 7/34, 7/36

(56) References Cited

U.S. PATENT DOCUMENTS

| | | |
|---|---|---|
| 4,748,675 | 5/1988 | Suzuki et al. . |
| 4,992,868 * | 2/1991 | Holtz ....................................... 348/417 |
| 5,117,287 | 5/1992 | Koike et al. . |
| 5,136,659 * | 8/1992 | Kanecko ............................... 382/243 |
| 5,295,201 * | 3/1994 | Yokohama ........................... 348/416 |
| 5,524,064 | 6/1996 | Oddou et al. . |
| 5,799,109 * | 8/1998 | Chung ................................... 382/243 |

FOREIGN PATENT DOCUMENTS

| | | |
|---|---|---|
| 2 296 839 | 7/1996 | (GB) . |
| 8-116540 | 5/1996 | (JP) ................................. H04N/7/32 |
| 8-280030 | 10/1996 | (JP) ................................. H04N/7/32 |
| 10-208060 | 8/1998 | (JP) ................................. H04N/7/32 |
| 10-234046 | 9/1998 | (JP) ................................. H04N/7/32 |

OTHER PUBLICATIONS

Mushmann H.G. et al., "Object–Oriented Analysis–Synthesis Coding of Moving Images", Signal Processing Image Communication, vol. 1, Jan. 1, 1989, pp. 117–138.

Hoetter M., "Object–Oriented Analysis–Synthesis Coding Based on Moving Two–Dimensional Objects", Signal Processing, Image Communication, vol. 2, No. 4, Dec. 1, 1990, pp. 409–428.

VM Action Group, "MPEG–4 Video Verification Model Version 1.0 (Report ISO/IEC JTC1/SC29/WG11 MPEG4/N1172)", Jan. 1996, ISO/IEC XP00204798 p. 3, Paragraph 1 —p. 10, Paragraph 1; figures 2.1.1, 3.1.2.

* cited by examiner

Primary Examiner—Howard Britton
(74) Attorney, Agent, or Firm—Fish & Richardson P. C.

(57) ABSTRACT

A method and an apparatus for predictively coding shape information of a video signal. An error between the current shape information and the previous shape information is obtained through the comparison therebetween. If the obtained error is greater than or equal to a predetermined reference value, the current shape information is coded. However, in the case where the obtained error is smaller than the predetermined reference value, the current shape information is reconstructed using the previous shape information. Therefore, a time-axis redundancy of the shape information is removed to prevent the transmission of unnecessary information, resulting in an increase in compression coding efficiency.

17 Claims, 7 Drawing Sheets

METHOD AND APPARATUS FOR PREDICTIVELY CODING SHAPE INFORMATION OF VIDEO SIGNAL

BACKGROUND OF THE INVENTION

1. Field of the Invention

The present invention relates in general to coding a video signal in a desired unit, and more particularly to a method and an apparatus for predictively coding shape information of the video signal, which compare shape information of the current image with that of the previous image to obtain a difference therebetween and code the shape information of the current image only when the obtained difference exceeds a predetermined reference value. For example, the present invention is applicable to a shape information coding method of the moving picture experts group-4 (referred to hereinafter as MPEG-4) which is an international standard on moving pictures and audio coding, and other image coding methods considering shape information.

2. Description of the Prior Art

Conventionally, in coding a moving picture in the unit of object, shape information are transmitted together with motion information beginning with that having the highest priority, for the prediction of motion compensation. At this time, different motion information must be applied to adjacent pixels on the object boundary.

Several approaches to representing such an area boundary have been proposed in fields such as computer graphics, character recognition, object synthesis, etc. For example, such approaches may be chain coding, polygon approximation and spline approximation. However, such approaches do not consider transmission. In this connection, it is difficult to transmit coded shape information of a motion region of each frame because of a high transmission rate.

A contour predictive coding method has been suggested to solve the above problem. A high redundancy is present between shape information of a motion region of the same object in successive images. On the basis of such a characteristic, the contour predictive coding method is adapted to perform motion compensation prediction of a contour and transmit the predicted error to reduce a shape information transmission amount. Shape information of a motion region of the same object on successive frames are very analogous in form and position. As a result, the current shape information can be predicted on the basis of the previous shape information. Further, motion information of a moving object is estimated and motion compensation prediction is performed with respect to shape information according to the estimated motion information. In the case where the motion region extraction and motion information estimation are ideally accurate, the transmission of shape information is not necessary.

However, in the above-mentioned contour predictive coding method, the shape information becomes more important as the transmission rate becomes lower. In this connection, an efficient coding method is required to significantly reduce shape information to obtain a higher coding gain than that of a block-unit coding method requiring no transmission of shape information.

In order to solve the problem with the above-mentioned contour predictive coding method, there has been proposed a thresholding operation method selecting a transmission prediction error, which is disclosed in U.S. patent application Ser. No. 08/478,558, filed in the name of Hyundai Electronics Industrious Co, Ltd. The thresholding operation method does not transmit information having no effect on the human's eyesight, or information having no effect on the subjective picture quality, so as to make coding at a low transmission rate possible.

A binary image representing region/non-region or the boundary thereof may be indicated by a contour, but a high redundancy is present between shape information of a motion region of the same object in successive images. As a result, because the coding operation is unconditionally performed with no consideration of a coding efficiency regarding time-axis shape information of the image, the compression coding efficiency is degraded.

Recently, ISO/IEC/WG11 has considered a method of coding an object with arbitrary shape information, differently from MPEG-1 and MPEG-2 performing frame-unit coding.

Here, a given video is divided into a background image and an object image, and a rectangle including the divided background image and object image is defined as a video object plane (referred to hereinafter as VOP). In MPEG-4, in the case where object regions including desired objects or areas are present in images, they are divided into VOPs and the divided VOPs are coded individually.

Such a VOP has the advantage of freely synthesizing or disintegrating a natural image or an artificial image as the unit of object image. As a result, the VOP is a fundamental factor in processing an object image in fields such as computer graphics, multimedia, etc.

FIG. 2 is a view illustrating a conventional VOP with shape information, which is partitioned into macro blocks. As shown in this drawing, a horizontal size of the VOP is defined as a VOP width and a vertical size thereof is defined as a VOP height. The left top corner of the VOP is defined as a grid start point, and the VOP is partitioned into M×N macro blocks, each of which includes M pixels on the X-axis and N pixels on the Y-axis. For example, the VOP may be partitioned into 16×16 macro blocks, each of which includes 16 pixels on the X-axis and 16 pixels on the Y-axis.

Noticeably, in the case where macro blocks at the rightmost and bottom portions of the VOP do not include M pixels on the X-axis and N pixels on the Y-axis, respectively, the VOP is enlarged in size in such a manner that the X and Y-axis pixels of each of the macro blocks can be M and N in number, respectively.

Both M and N are set to an even number so that a texture coder can perform sub block-unit coding, as will be mentioned later.

A redundancy is present between contours of a motion region on the time-axis. Such a redundancy must be removed to make compression coding efficient. Namely, in the case where motion of shape information of the current VOP is negligibly small, shape information of the previous VOP can be directly used. In this case, there is no necessity for coding the shape information of the current VOP to transmit it. However, conventionally, shape information of a given VOP is unconditionally coded and transmitted to a decoder. As a result, image coding and compression efficiencies are degraded.

SUMMARY OF THE INVENTION

Therefore, the present invention has been made in view of the above problems, and it is an object of the present invention to provide a method and an apparatus for predictively coding shape information of a video signal in the unit of image. Shape information of the current image is compared with that of the previous image in the unit of pixel or block to obtain a difference therebetween. Only when the obtained difference exceeds a predetermined reference value, the shape information of the current image is coded. Otherwise, the current mode is decided on a not-coded mode. In this case, the current shape information is not coded, and it is reconstructed using the already transmitted previous shape information. To this end, only not-coded mode information is transmitted to a decoder. Therefore, conventional individual contour compression is not performed, resulting in an increase in compression coding efficiency.

In accordance with one aspect of the present invention, there is provided a method for predictively coding shape information of a video signal, comprising the first step of comparing the current shape information with the previous shape information to obtain an error therebetween; the second step of coding the current shape information if the error obtained at the first step is greater than or equal to a predetermined reference value; and the third step of reconstructing the current shape information using the previous shape information if the error obtained at the first step is smaller than the predetermined reference value.

The first step includes the step of comparing pixels in the current shape information with those in the previous shape information.

Also, the first step may include the step of comparing blocks in the current shape information with those in the previous shape information.

Further, the first step may include the step of moving a reference point of the previous shape information to a reference point of the current shape information to compare the current shape information with the previous shape information.

Further, the first step may include the step of moving a reference point of the current shape information to a reference point of the previous shape information to compare the current shape information with the previous shape information.

The previous shape information is the most recently coded shape information.

The first step includes the step of putting the previous shape information and the current shape information on a reference position, calculating the number of pixels in non-overlapped regions and dividing the calculated value by the total number of pixels in the current shape information to obtain the error between the current shape information and the previous shape information.

Also, the first step may include the step of putting the previous shape information and the current shape information on a reference position, calculating the number of blocks in non-overlapped regions and dividing the calculated value by the total number of blocks in the current shape information to obtain the error between the current shape information and the previous shape information.

A bit of logic "1" or "0" is transmitted to a decoder to indicate whether the current shape information is coded or not. The bit is contained in a bit stream to be transmitted to the decoder.

The bit of logic "1" indicates that the current shape information is coded.

The bit of logic "0" indicates that the current shape information is not coded.

A plurality of bits are transmitted to a decoder to indicate whether the current shape information is coded or not. The bits are contained in a bit stream to be transmitted to the decoder.

The shape information is a video object plane.

In accordance with another aspect of the present invention, there is provided an apparatus for predictively coding shape information of a video signal, comprising error calculation means for calculating an error between the current shape information and the previous shape information on the basis of pixels; coding determination means for comparing the error calculated by the error calculation means with a reference value and, in accordance with the compared result, determining whether the current shape information is to be coded; mode transmission means for transmitting mode information in response to an output signal from the coding determination means; and shape information coding means for coding the current shape information in response to the mode information from the mode transmission means and transferring the coded shape information to a multiplexer.

The mode transmission means transmits a bit of logic "1" as the mode information to the shape information coding means if the error calculated by the error calculation means is larger than or equal to the reference value and a bit of logic "0" as the mode information to the shape information coding means if the error calculated by the error calculation means is smaller than the reference value.

In brief, an error between the current shape information and the previous shape information is obtained through the comparison therebetween. If the obtained error is greater than or equal to a predetermined reference value, the current shape information is coded. However, in the case where the obtained error is smaller than the predetermined reference value, the current shape information is reconstructed using the previous shape information. Therefore, a time-axis redundancy of a binary mask is removed to prevent the transmission of unnecessary information, resulting in an increase in compression coding efficiency.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1:
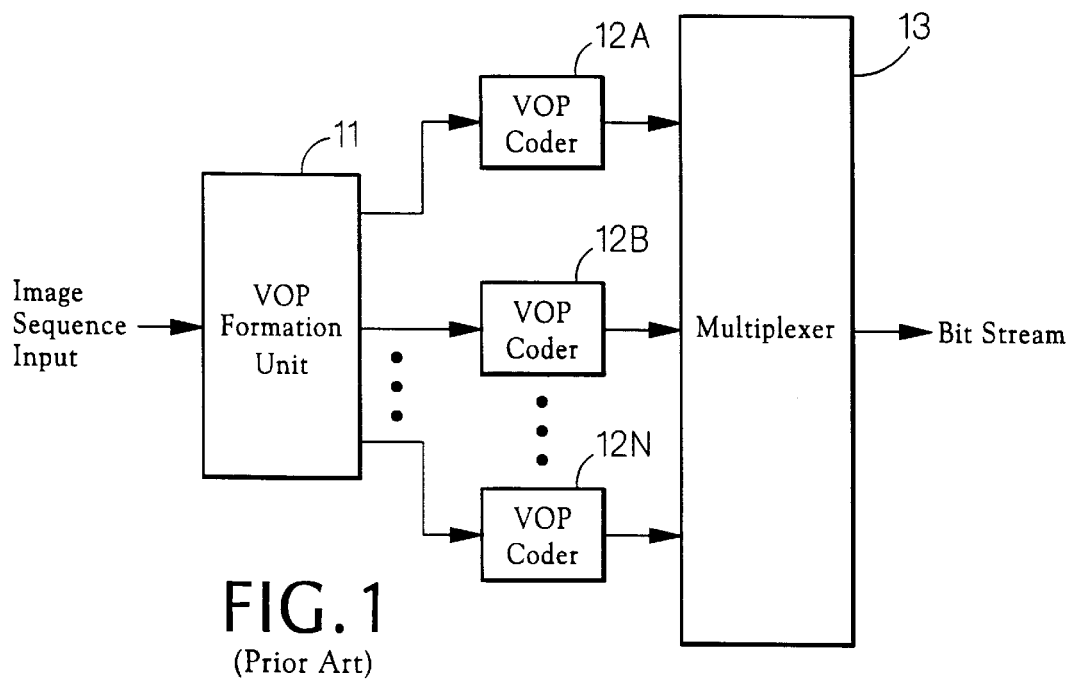
FIG. 1 is a block diagram illustrating the construction of a conventional encoder.

FIG. 1 is a block diagram illustrating the construction of a conventional verification model encoder 10, firstly established by ISO/IEC JTC1/SC29/WG11 MPEG96/N1172 JANUARY. As shown in this drawing, the encoder 10 comprises a VOP formation unit 11, VOP coders 12A, 12B, ..., 12N and a multiplexer 13.

The VOP formation unit 11 is adapted to input an image sequence to be transmitted or stored, divide the inputted image sequence into object images and form VOPs corresponding respectively to the divided object images.

Figure 2:
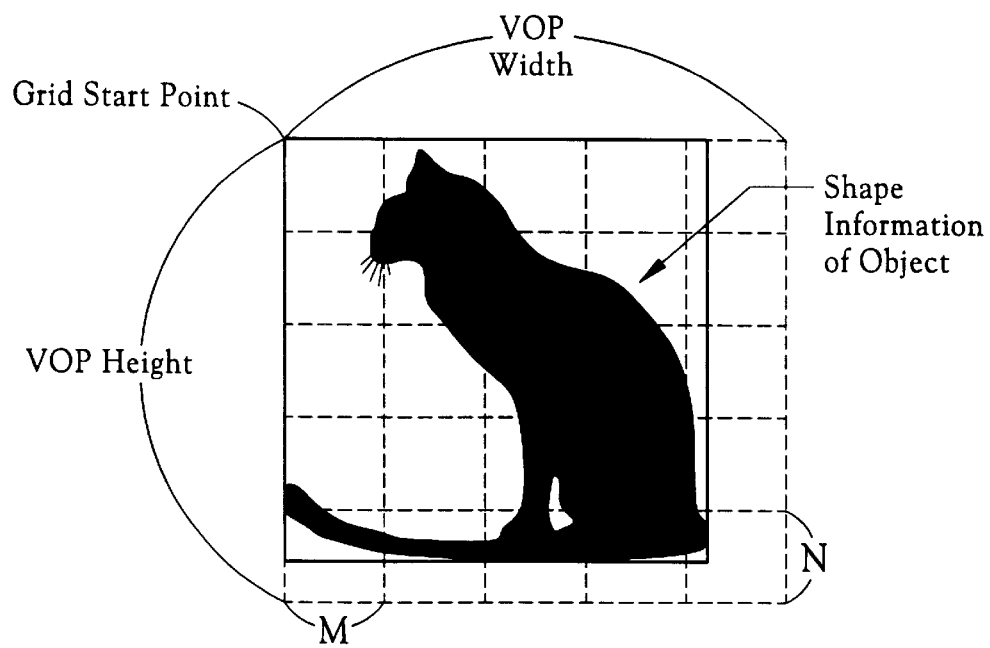
FIG. 2 is a view illustrating a conventional VOP with shape information, which is partitioned into macro blocks.

As stated previously with reference to FIG. 2, conventionally, the VOP is composed of M×N macro blocks beginning with the grid start point at the left top corner, each of which includes M pixels on the X-axis and N pixels on the Y-axis. However, in the case where pixels having object image or shape information are present in many macro blocks, the number of macro blocks to be shape information-coded is increased, resulting in a degradation in coding efficiency.

On the other hand, the VOPs formed by the VOP formation unit 11 are respectively coded by the VOP coders 12A, 12B, ..., 12N, multiplexed by the multiplexer 13 and transmitted as a bit stream.

Figure 3:
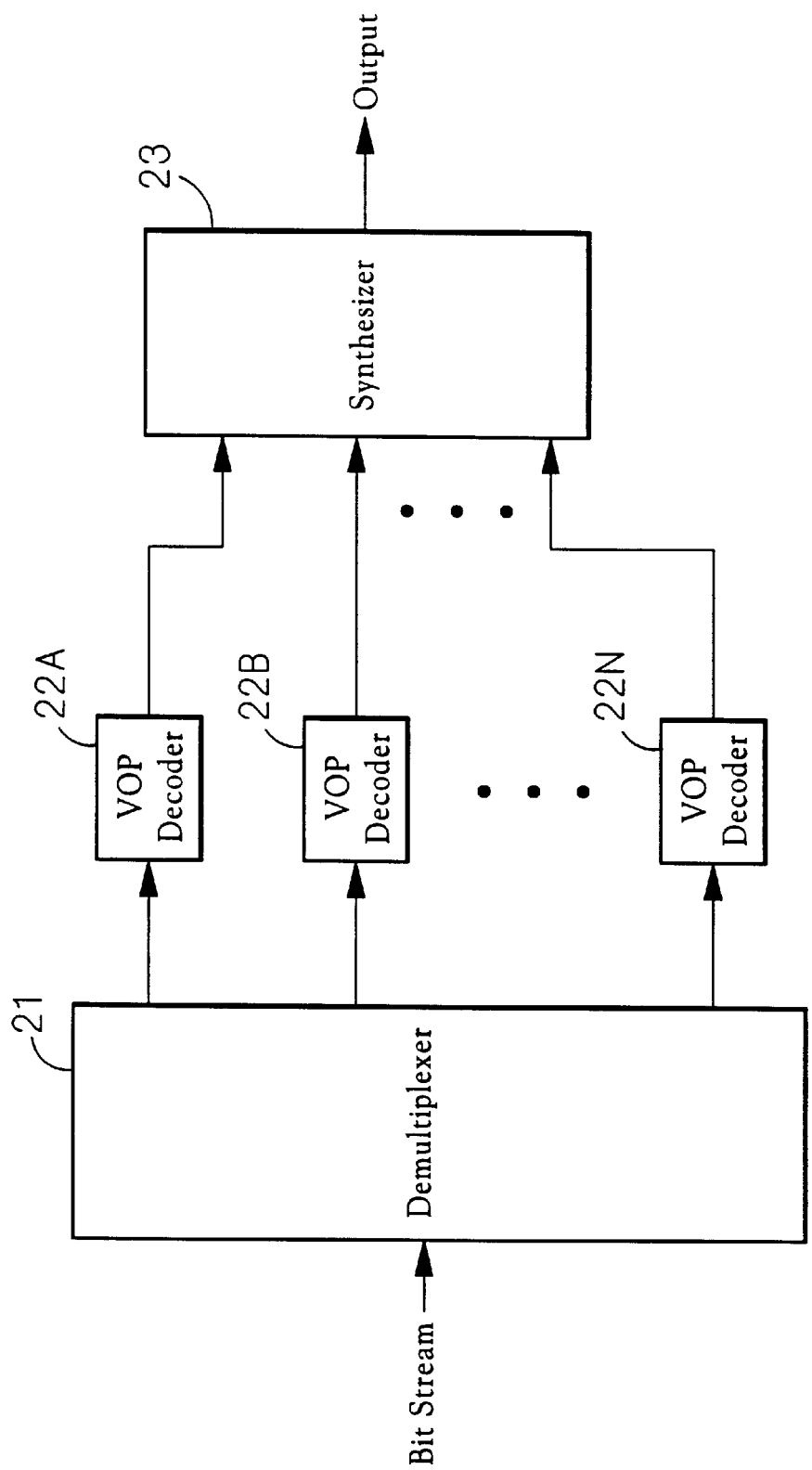
FIG. 3 is a block diagram illustrating the construction of a conventional decoder.

FIG. 3 is a block diagram illustrating the construction of a conventional verification model decoder 20, firstly established by ISO/IEC JTC1/SC29/WG11 MPEG96/N1172 JANUARY. As shown in this drawing, the decoder 20 comprises a demultiplexer 21, VOP decoders 22A, 22B, ..., 22N and a synthesizer 23.

The VOP information coded and transmitted as the bit stream by the encoder 10 in FIG. 1 is divided into VOP coded signals by the demultiplexer 21.

The VOP coded signals from the demultiplexer 21 are decoded respectively by the VOP decoders 22A, 22B, ..., 22N and synthesized into the original images by the synthesizer 23.

Figure 4:
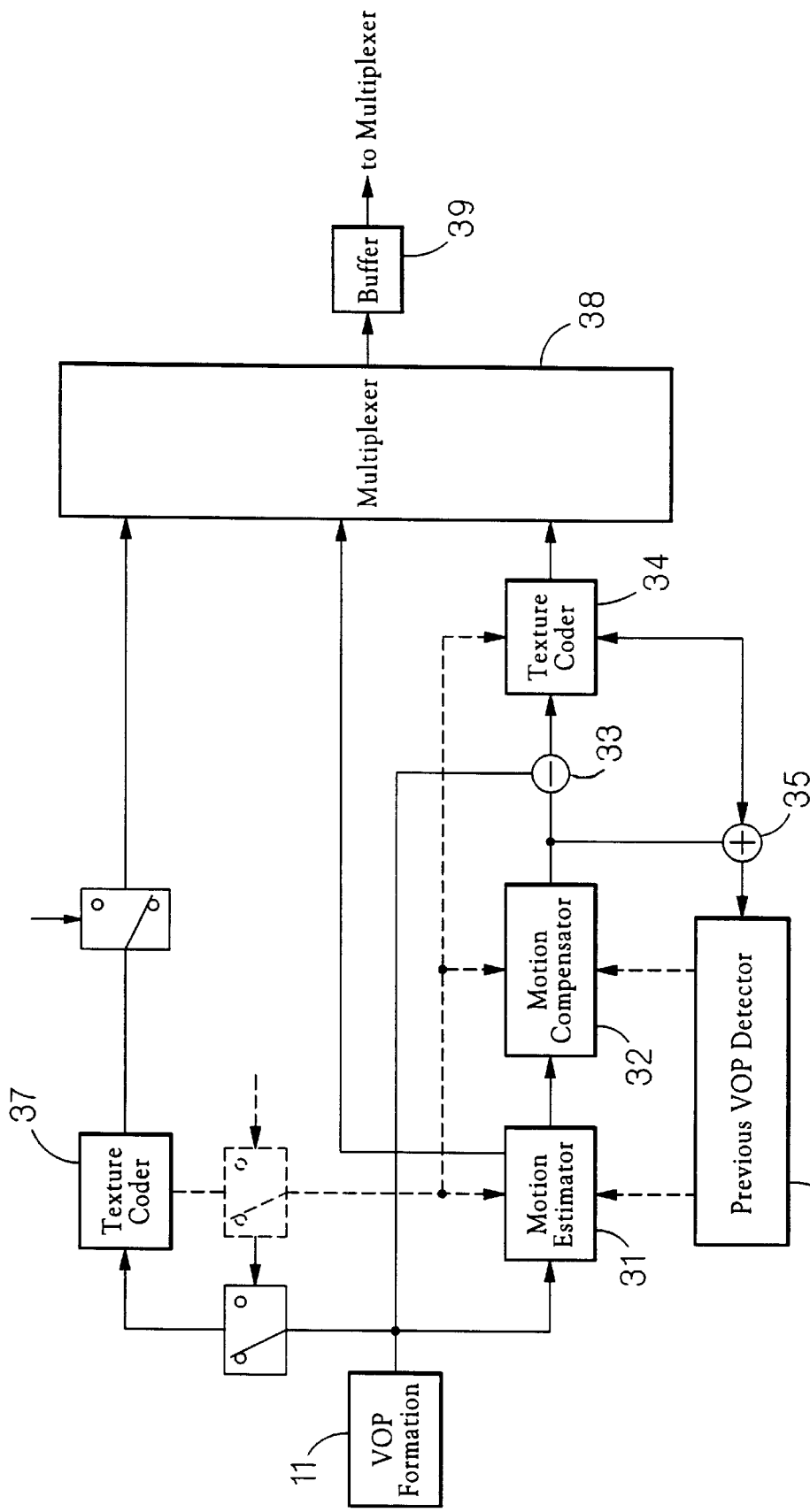
FIG. 4 is a block diagram illustrating the construction of a VOP coder in the encoder of FIG. 1.

FIG. 4 is a block diagram illustrating the construction of each of the VOP coders 12A, 12B, ..., 12N in the encoder 10 in FIG. 1. As shown in this drawing, each VOP coder includes a motion estimator 31, a motion compensator 32, a subtracter 33, a texture coder 34, an adder 35, a previous VOP detector 36, a shape coder 37, a multiplexer 38 and a buffer 39.

The motion estimator 31 is adapted to estimate macro block-unit motion of the corresponding VOP from the VOP formation unit 11.

The motion compensator 32 is adapted to compensate for the motion information estimated by the motion estimator 31.

The subtracter 33 is adapted to detect a difference between the VOP from the VOP formation unit 11 and the motion-compensated VOP from the motion compensator 32.

The texture coder 34 is adapted to code texture information in the unit of sub block in macro block in response to the difference detected by the subtracter 33. Each macro block is subdivided into sub blocks. For example, if M and N are 16 and each sub block includes M/2 pixels on the X-axis and N/2 pixels on the Y-axis, then each macro block is subdivided into 8×8 sub blocks. The texture information is coded in the unit of sub block.

The adder 35 is adapted to add the texture information coded by the texture coder 34 to the motion-compensated VOP from the motion compensator 32.

The previous VOP detector 36 is adapted to detect a previous VOP, or a VOP of an image just before the current image, from an output signal from the adder 35.

The previous VOP detected by the previous VOP detector 36 may be applied to the motion estimator 31 and the motion compensator 32 to be used for the motion estimation and compensation.

The shape coder 37 is adapted to code shape information of the VOP from the VOP formation unit 11.

Noticeably, an output signal from the shape coder 37 is variably used according to fields to which the VOP coders 12A, 12B, ..., 12N are applied. As indicated by the dotted lines in the drawing, the output signal from the shape coder 37 may be provided to the motion estimator 31, the motion compensator 32 and the texture coder 34 to be used for the motion estimation and compensation and the texture information coding.

The motion information estimated by the motion estimator 31, the texture information coded by the texture coder 34 and the shape information coded by the shape coder 37 are multiplexed by the multiplexer 38 and transmitted through the buffer 39 to the multiplexer 13 in FIG. 1 for the transmission in the form of bit stream.

In MPEG-4, various shape coding techniques can be applied to the shape coder 37 which codes shape information of each VOP from the VOP formation unit 11. For example, one such technique may be an MMR shape coding technique which codes shape information on the basis of N×N blocks, where N=16, 8 or 4. Other shape coding techniques may be a vertex-based shape coding technique, a baseline-based shape coding technique, a context-based arithmetic coding technique, etc.

For a better understanding of the present invention, the fundamental conception will first be mentioned before detailed description of the preferred embodiments.

First, the unit image for coding (UIC) will be described. In conventional image coding standards such as MPEG-1 and MPEG-2, there has been proposed a block-based coding technique for coding a video signal in the unit of frame, macro block or unit block regardless of the contents of image. However, as the requirements of multimedia function are increased, the necessity for video signal coding around object is increased, as well. Such an object-around coding technique requires the prescription of a new coding unit around object, not a fixed coding unit such as the conventional frame or block unit. In other words, the original frame-unit video signal is divided into significant object images with shape information, and the coding is performed with respect to each of the divided object images as a coding unit. For example, in MPEG-4, the VOP is defined as the unit image for coding.

Here, the previous shape information includes original previous shape information just before the current shape information, and reconstructed shape information of the previous original shape information, coded and stored in a memory (not shown). An error of the current shape information is detected on the basis of the previous shape information, or the previous original shape information or the reconstructed shape information. When the detected error exceeds a reference value, the current shape information is coded. To the contrary, if the detected error is smaller than the reference value, the current shape information is not coded and the reconstructed shape information is used as the current shape information.

In the case where the reconstructed shape information is different from the previous original shape information, or it has an error, under the condition that the previous original shape information is still, the coding is not performed because the previous original shape information is equal to the current shape information. As a result, the subjective picture quality (substantially visible picture quality) becomes excellent.

However, in the case where the reconstructed shape information has no error, it is equal to the previous original shape information. In this case, it is advantageous to use the reconstructed shape information rather than the previous original shape information. The reason is that, when the previous original shape information is used, the reconstructed shape information thereof must be stored in a separate memory, resulting in an increase in cost and a complexity in process.

On the other hand, in the case where an error between the reconstructed shape information and the current shape information and an error between the previous original shape information and the current shape information are both larger than the reference value, the reconstructed shape information is used for coding.

Now, the preferred embodiment of the present invention will be mentioned in detail with reference to FIGS. 5 to 9.

Figure 8:
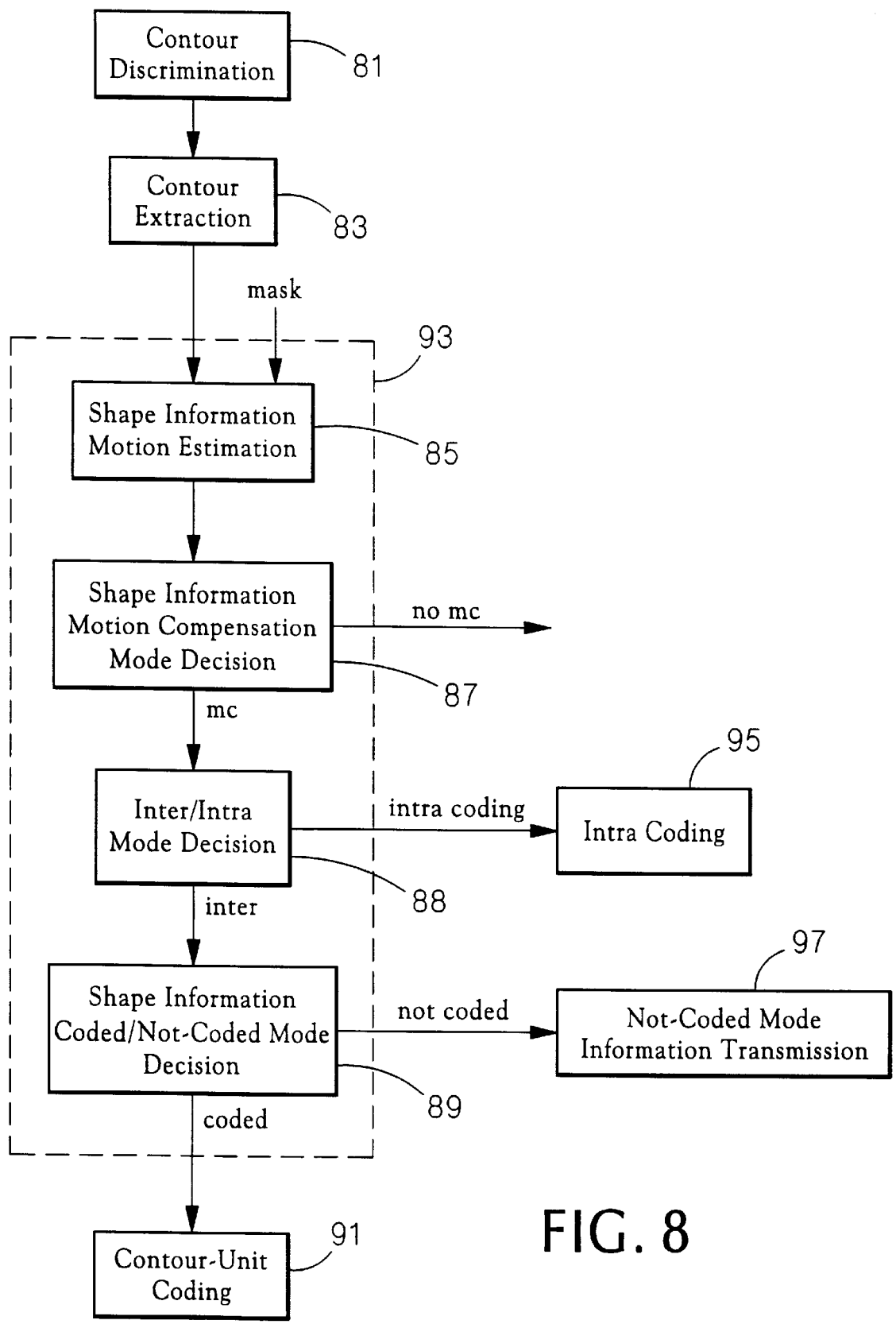
FIG. 8 is a flowchart schematically illustrating a process to which the present invention is applied.

FIG. 8 is a flowchart schematically illustrating a process to which the present invention is applied.

First, the contour discrimination step 81 is performed to discriminate a plurality of contours in one shape information. The contour extraction step 83 is performed to extract the contours discriminated at the contour discrimination step 81.

After the contours are extracted at the contour extraction step 83, the shape information coding step 93 is performed. The shape information coding step 93 includes the shape information motion estimation step 85, the shape information motion compensation mode decision step 87, the inter/intra mode decision step 88 and the shape information coded/not-coded mode decision step 89.

If the current mode is decided on an intra mode at the inter/intra mode decision step 88, the intra coding step 95 is performed. However, in the case where the current mode is decided on an inter mode at the inter/intra mode decision step 88, the shape information coded/not-coded mode decision step 89 is performed.

If the current mode is decided on a shape information coded mode at the shape information coded/not-coded mode decision step 89, the contour-unit coding step 91 is performed. However, in the case where the current mode is decided on a shape information not-coded mode at the shape information coded/not-coded mode decision step 89, the not-coded mode information transmission step 97 is performed.

Figure 9:
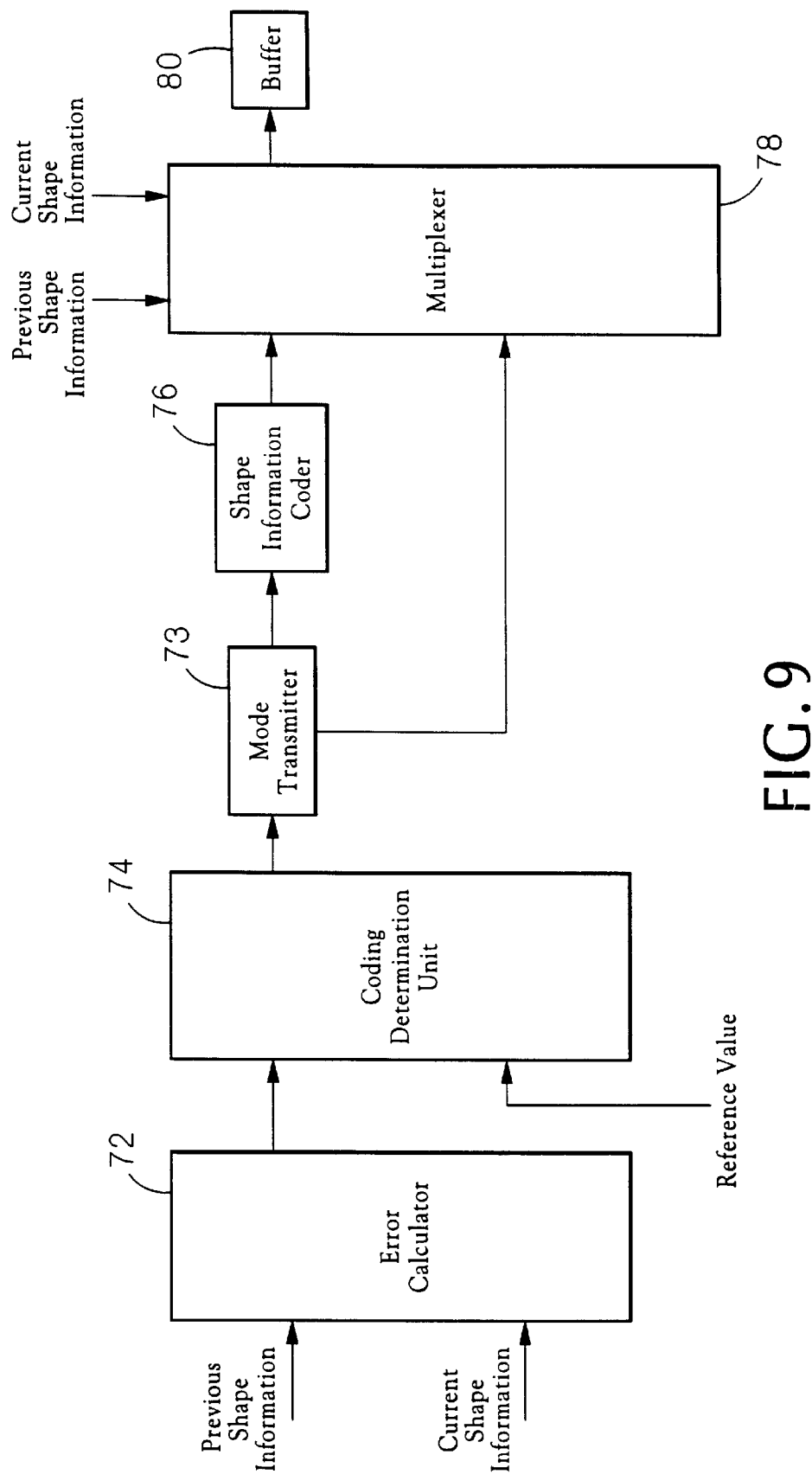
FIG. 9 is a schematic block diagram illustrating the construction of an apparatus for predictively coding shape information of a video signal in accordance with the present invention.

FIG. 9 is a schematic block diagram illustrating the construction of an apparatus for predictively coding shape information of a video signal in accordance with the present invention.

Preferably, the shape information predictive coding apparatus may be implemented on the basis of a vertex-based shape coding technique. As shown in FIG. 9, the shape information predictive coding apparatus comprises an error calculator 72, a mode transmitter 73, a coding determination unit 74, a shape information coder 76, a multiplexer 78 and a buffer 80.

The error calculator 72 is adapted to calculate an error between the current shape information and the previous shape information on the basis of pixels.

The coding determination unit 74 is adapted to compare the error calculated by the error calculator 72 with a reference value and, in accordance with the compared result, determine whether the current shape information is to be coded. For example, if a pixel variation of the current shape information is larger than the reference value, the coding determination unit 74 determines the coding of the current shape information. Otherwise, the coding determination unit 74 determines the reconstruction of the previous shape information as the current shape information without coding the current shape information.

The mode transmitter 73 is adapted to transmit one bit to the shape information coder 76 in accordance with the determined result of the coding determination unit 74. For example, if the error calculated by the error calculator 72 is larger than the reference value, the mode transmitter 73 transmits a bit of logic "1" to the shape information coder 76. However, in the case where the error calculated by the error calculator 72 is smaller than the reference value, the mode transmitter 73 transmits a bit of logic "0" to the shape information coder 76.

The shape information coder 76 is adapted to code the current shape information in response to an output signal from the mode transmitter 73. For example, if the output bit value from the mode transmitter 73 is 0, the shape information coder 76 does not code the current shape information because the error calculated by the error calculator 72 is smaller than the reference value. In this case, the previous shape information is reconstructed as the current shape information. To the contrary, in the case where the output bit value from the mode transmitter 73 is 1, the shape information coder 76 codes the current shape information because the error calculated by the error calculator 72 is larger than the reference value.

The shape information coded by the shape information coder 76 are multiplexed by the multiplexer 78 and applied to the buffer 80.

Figure 5:
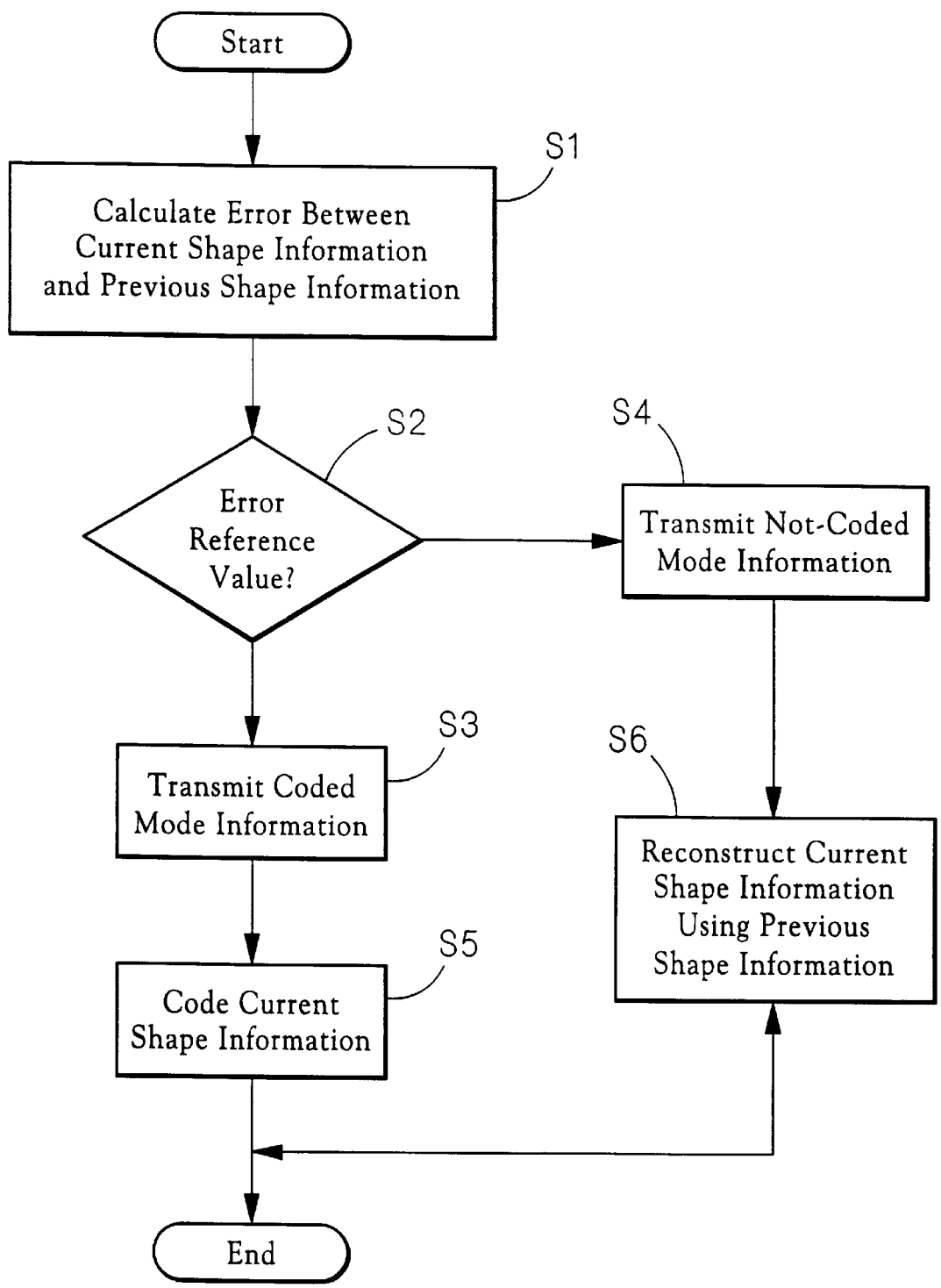
FIG. 5 is a flowchart illustrating a method for predictively coding shape information of a video signal in accordance with the present invention.

FIG. 5 is a flowchart illustrating a method for predictively coding shape information of a video signal in accordance with the present invention.

Preferably, the shape information predictive coding method may be implemented on the basis of a vertex-based shape coding technique.

First, an input image sequence is divided into object images with shape information.

Then, the error calculation step S1 is performed to calculate an error between the current shape information and the previous shape information through the comparison therebetween.

Figure 6:
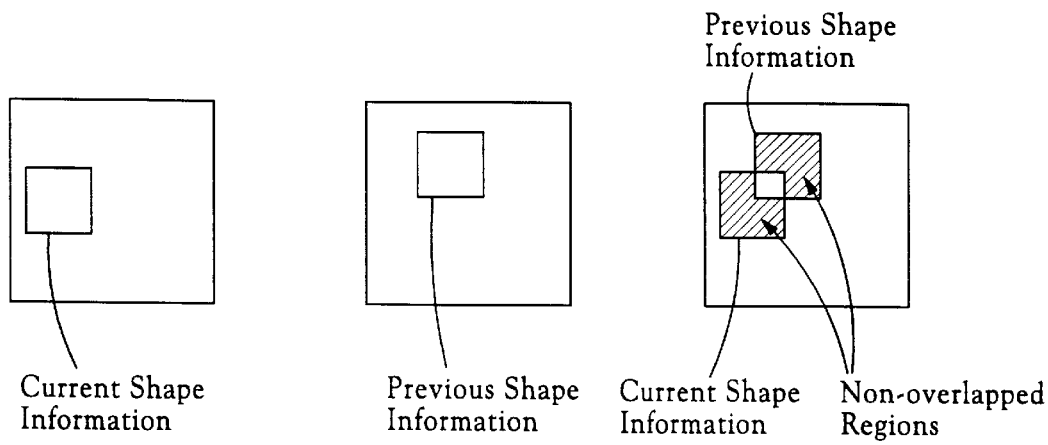
FIG. 6 is a view illustrating the comparison between the previous shape information and the current shape information in FIG. 5.

At the error calculation step S1, as shown in FIG. 6, the previous shape information and the current shape information are put on a reference position and the number of pixels in non-overlapped regions is calculated. Then, the shape information error is obtained by dividing the calculated value by the total number of pixels in the current shape information. Alternatively, the error between the current shape information and the previous shape information may be obtained in the unit of block. In this case, the number of blocks in non-overlapped regions is calculated and the calculated value is divided by the total number of blocks in the current shape information to obtain the shape information error.

After the error calculation step S1 is performed, the error comparison step S2 is performed to compare the error calculated at the error calculation step S1 with a predetermined reference value. For example, if the calculated error is larger than or equal to the reference value (e.g., 0.005), it is determined that the current shape information has a variation with respect to the previous shape information. To the contrary, in the case where the calculated error is smaller than the reference value, it is determined that the current shape information has no variation with respect to the previous shape information. Here, the reference value is a threshold to the shape information variation. The reference value may be set to different values according to whether the comparison factor is a pixel or a block.

In the case where the calculated error is larger than or equal to the reference value at the error comparison step S2, the coded mode information transmission step S3 is performed to transmit a bit of logic "1" as coded mode information.

If the case where the calculated error is smaller than the reference value at the error comparison step S2, the not-coded mode information transmission step S4 is performed to transmit a bit of logic "0" as not-coded mode information.

Alternatively, a bit of logic "0" may be transmitted as the coded mode information at the coded mode information transmission step S3, and a bit of logic "1" may be transmitted as the not-coded mode information at the not-coded mode information transmission step S4.

If the coded mode information is transmitted at the coded mode information transmission step S3, the shape information coding step S5 is performed to code the current shape information.

However, in the case where the not-coded mode information is transmitted at the not-coded mode information transmission step S4, the shape information reconstructing step S6 is performed to reconstruct the current shape information using the previous shape information, instead of coding the current shape information.

Preferably, the most recently coded shape information must be used as the previous shape information to reduce an error due to the accumulation of fine variations.

Figure 7:
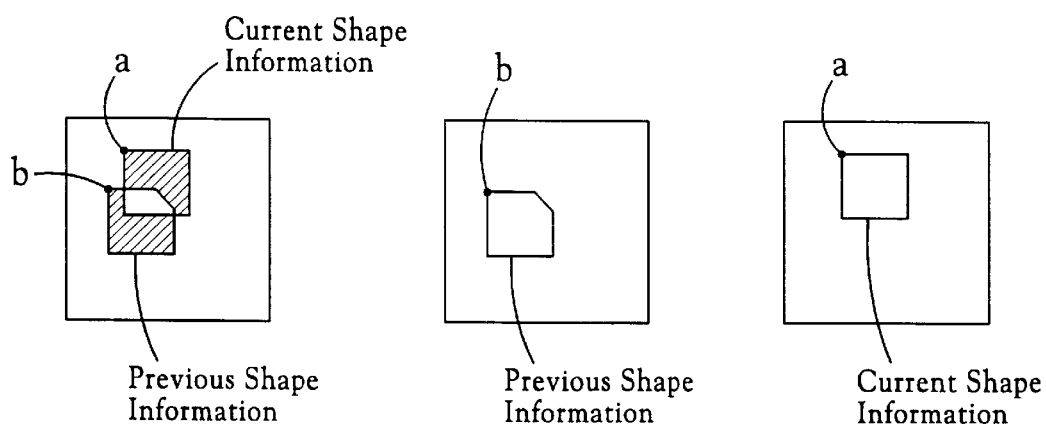
FIG. 7 is a view illustrating reference points for the comparison between the previous shape information and the current shape information in FIG. 5.

On the other hand, the comparison between the previous shape information and the current shape information is performed in decoding the current shape information being coded. As shown in FIG. 7, such comparison is performed by moving a reference point b of the previous shape information to a reference point a of the current shape information. Alternatively, such comparison may be performed by moving the reference point a of the current shape information to the reference point b of the previous shape information.

As mentioned above, in the case where the just previously inputted shape information is used as the previous shape information regardless of whether the current shape information is coded or not, a discrete video appears due to the accumulation of errors resulting from motions below the reference value. Therefore, the most recently coded shape information is employed as the previous shape information to prevent the video discreteness due to the accumulation of fine variations.

As apparent from the above description, the present invention provides the method and apparatus for predictively coding shape information of the video signal in the unit of image. Shape information of the current image is compared with that of the previous image in the unit of pixel or block to obtain a difference therebetween. Only when the obtained difference exceeds the predetermined reference value, the shape information of the current image is coded. Otherwise, the current shape information is reconstructed using the already transmitted previous shape information. Therefore, the transmission of unnecessary information is prevented to enhance the compression coding efficiency.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for predictively coding shape information of a video signal, comprising the steps of:
   (a) comparing the current shape information with the previous shape information to obtain an error therebetween;
   (b) coding the current shape information if the error obtained at said step (a) is greater than or equal to a predetermined reference value; and
   (c) reconstructing the current shape information using the previous shape information if the error obtained at said step (a) is smaller than said predetermined reference value.

2. A method for predictively coding shape information of a video signal, as set forth in claim 1, wherein the previous shape information is the most recently coded shape information.

3. A method for predictively coding shape information of a video signal, as set forth in claim 1, wherein said step (a) includes the step of comparing pixels in the current shape information with those in the previous shape information.

4. A method for predictively coding shape information of a video signal, as set forth in claim 1, wherein said step (a) includes the step of comparing blocks in the current shape information with those in the previous shape information.

5. A method for predictively coding shape information of a video signal, as set forth in claim 1, wherein said step (a) includes the step of moving a reference point of the previous shape information to a reference point of the current shape information to compare the current shape information with the previous shape information in a decoding process.

6. A method for predictively coding shape information of a video signal, as set forth in claim 1, wherein said step (a) includes the step of moving a reference point of the current shape information to a reference point of the previous shape information to compare the current shape information with the previous shape information in a decoding process.

7. A method for predictively coding shape information of a video signal, as set forth in claim 1, wherein said step (a) includes the step of putting the previous shape information and the current shape information on a reference position, calculating the number of pixels in non-overlapped regions and dividing the calculated value by the total number of pixels in the current shape information to obtain the error between the current shape information and the previous shape information.

8. A method for predictively coding shape information of a video signal, as set forth in claim 1, wherein said step (a) includes the step of putting the previous shape information and the current shape information on a reference position, calculating the number of blocks in non-overlapped regions and dividing the calculated value by the total number of blocks in the current shape information to obtain the error between the current shape information and the previous shape information.

9. A method for predictively coding shape information of a video signal, as set forth in claim 1, further comprising the step of transmitting a bit of logic "1" or "0" to a decoder to indicate whether the current shape information is coded or not, said bit being contained in a bit stream to be transmitted to said decoder.

10. A method for predictively coding shape information of a video signal, as set forth in claim 9, wherein the bit of logic "1" indicates that the current shape information is coded.

11. A method for predictively coding shape information of a video signal, as set forth in claim 9, wherein the bit of logic "0" indicates that the current shape information is not coded.

12. A method for predictively coding shape information of a video signal, as set forth in claim 1, further comprising the step of transmitting a plurality of bits to a decoder to indicate whether the current shape information is coded or not, said bits being contained in a bit stream to be transmitted to said decoder.

13. A method for predictively coding shape information of a video signal, as set forth in claim 1, wherein the shape information is a video object plane.

14. A method for predictively coding shape information of a video signal, as set forth in claim 1, wherein the previous shape information includes original previous shape information just before the current shape information.

15. A method for predictively coding shape information of a video signal, as set forth in claim 1, wherein the previous shape information includes reconstructed shape information stored in a memory.

16. An apparatus for predictively coding shape information of a video signal, comprising:

error calculation means for calculating an error between current shape information and previous shape information on the basis of pixels;

coding determination means for comparing the error calculated by said error calculation means with a reference value and, in accordance with the compared result, for determining that the current shape information is to be coded if the error is greater than the reference value;

mode transmission means for transmitting mode information in response to an output signal from said coding determination means; and shape information coding means for coding the current shape information in response to said mode information from said mode transmission means and transferring the coded shape information to a multiplexer.

17. An apparatus for predictively coding shape information of a video signal, as set forth in claim 16, wherein said mode transmission means transmits a bit of logic "1" as said mode information to said shape information coding means if the error calculated by said error calculation means is larger than or equal to said reference value and a bit of logic "0" as said mode information to said shape information coding means if the error calculated by said error calculation means is smaller than said reference value.

* * * * *